United States Patent
Wang et al.

(10) Patent No.: US 8,798,663 B2
(45) Date of Patent: Aug. 5, 2014

(54) METHOD OF PERFORMING POWER HEADROOM REPORTING AND COMMUNICATION DEVICE THEREOF

(75) Inventors: Chun-Yen Wang, New Taipei (TW); Shiang-Jiun Lin, New Taipei (TW); Tzu-Ming Lin, New Taipei (TW); Chun-Chia Chen, New Taipei (TW)

(73) Assignee: Acer Incorporated, Xizhi Dist., New Taipei (TW)

( * ) Notice: Subject to any disclaimer, the term of this patent is extended or adjusted under 35 U.S.C. 154(b) by 368 days.

(21) Appl. No.: 13/235,525

(22) Filed: Sep. 19, 2011

(65) Prior Publication Data
US 2012/0083308 A1    Apr. 5, 2012

Related U.S. Application Data

(60) Provisional application No. 61/388,801, filed on Oct. 1, 2010.

(51) Int. Cl.
*H04W 52/04*    (2009.01)

(52) U.S. Cl.
USPC .............................. 455/522; 455/69; 455/515

(58) Field of Classification Search
USPC ................. 455/522, 69, 67.11, 512, 515, 434; 370/329
See application file for complete search history.

(56) References Cited

U.S. PATENT DOCUMENTS

2010/0158147 A1* 6/2010 Zhang et al. .................. 375/260
2010/0232385 A1* 9/2010 Hsu ................................ 370/329

FOREIGN PATENT DOCUMENTS

RU    2009 102 826 A    8/2010

OTHER PUBLICATIONS

Catt, Considerations on uplink power control in LTE-Advanced, 3GPP TSG RAN WG1 meeting #59bis, R1-100071, Jan. 18-22, 2010, XP050417814, Valencia, Spain.

* cited by examiner

*Primary Examiner* — John J Lee
(74) *Attorney, Agent, or Firm* — Winston Hsu; Scott Margo

(57) ABSTRACT

A method of performing power headroom reporting, hereafter called PHR, for a communication device configured with a plurality of uplink component carriers or parallel PUCCH and PUSCH transmission in a wireless communication system is disclosed. The method comprises reporting power headroom information of at least one of the communication device, at least an uplink component carrier, and at least a power amplifier configured to the communication device, to a network of the wireless communication system when the PHR is triggered.

21 Claims, 20 Drawing Sheets

FIG. 9

| R | R | BITMAP | Oct 1 |
|---|---|---|---|
| R | V | Type 1 PH of PCell | Oct 2 |
| R | V | Type 2 PH of PCell | Oct 3 |
| R | V | Type 1 PH of Scell#1 | Oct 4 |
| R | V | Type 1 PH of Scell#2 | Oct 5 |
| R | V | PH of PA#1 | Oct 6 |
| R | V | PH of PA#2 | Oct 7 |
| R | V | PH of UE | Oct 8 |

| R | R | BITMAP | Oct 1 |
|---|---|---|---|
| R | R | Type 1 PH of PCell | Oct 2 |
| R | R | Type 2 PH of PCell | Oct 3 |
| R | R | Type 1 PH of Scell#1 | Oct 4 |
| R | R | Type 1 PH of Scell#2 | Oct 5 |
| R | R | PH of PA#1 | Oct 6 |
| R | R | PH of PA#2 | Oct 7 |
| R | R | PH of UE | Oct 8 |

FIG. 10

Right table:

| | | | CC#4 | CC#3 | CC#2 | CC#1 | CC#0 | |
|---|---|---|---|---|---|---|---|---|
| R | R | R | 0 | 0 | 0 | 1 | 0 | Oct 1 |
| R | R | R | 0 | 0 | 1 | 0 | 0 | Oct 2 |
| R | R | Type 1 PH of PCell | | | | | | Oct 3 |
| R | R | Type 2 PH of PCell | | | | | | Oct 4 |
| R | R | Type 1 PH of Scell#1 | | | | | | Oct 5 |
| R | R | Type 1 PH of Scell#2 | | | | | | Oct 6 |
| R | R | PH of PA#1 | | | | | | Oct 7 |
| R | R | PH of PA#2 | | | | | | Oct 8 |
| R | R | PH of UE | | | | | | Oct 9 |

Left table:

| | | | | | | | | |
|---|---|---|---|---|---|---|---|---|
| BITMAP for PA#1 | | | | | | | | Oct 1 |
| BITMAP for PA#2 | | | | | | | | Oct 2 |
| Type 1 PH of PCell | | | | | | | | Oct 3 |
| Type 2 PH of PCell | | | | | | | | Oct 4 |
| Type 1 PH of Scell#1 | | | | | | | | Oct 5 |
| Type 1 PH of Scell#2 | | | | | | | | Oct 6 |
| PH of PA#1 | | | | | | | | Oct 7 |
| PH of PA#2 | | | | | | | | Oct 8 |
| PH of UE | | | | | | | | Oct 9 |

| | | |
|---|---|---|
| | | Oct 1 |
| | | Oct 2 |
| | | Oct 3 |
| | | Oct 4 |
| | | Oct 5 |
| | | Oct 6 |
| | | Oct 7 |
| | | Oct 8 |

| | | |
|---|---|---|
| 0 | 0 | PH of UE |
| 0 | 0 | Type 1 PH of PCell |
| 0 | 0 | Type 2 PH of PCell |
| 0 | 1 | Type 1 PH of Scell#2 |
| 0 | 0 | PH of PA#1 |
| 0 | 1 | Type 1 PH of Scell#1 |
| 1 | 1 | Type 1 PH of Scell#3 |
| 1 | 1 | PH of PA#2 |

| | | |
|---|---|---|
| | | Oct 1 |
| | | Oct 2 |
| | | Oct 3 |
| | | Oct 4 |
| | | Oct 5 |
| | | Oct 6 |
| | | Oct 7 |
| | | Oct 8 |

| R | R | PH of UE |
|---|---|---|
| CC ID | | Type 1 PH of PCell |
| CC ID | | Type 2 PH of PCell |
| CC ID | | Type 1 PH of Scell#2 |
| Starting point CC ID | | PH of PA#1 |
| CC ID | | Type 1 PH of Scell#1 |
| CC ID | | Type 1 PH of Scell#3 |
| Starting point CC ID | | PH of PA#2 |

The ID of the starting point CC

FIG. 11

| | |
|---|---|
| BITMAP | Oct 1 |
| Type 1 PH of PCell | Oct 2 |
| Type 2 PH of PCell | Oct 3 |
| Type 1 PH of Scell | Oct 4 |
| PH of PA#1 | Oct 5 |
| PH of UE | Oct 6 |

With R|R columns on left side for octets 2-6.

| | |
|---|---|
| Type 1 PH of PCell | Oct 1 |
| Type 2 PH of PCell | Oct 2 |
| Type 1 PH of Scell | Oct 3 |
| PH of PA#1 | Oct 4 |
| PH of UE | Oct 5 |

With CC ID columns for octets 1-3 and R|R for octets 4-5.

FIG. 13

| R | V | Type 1 PH of PCell | Oct 1
|---|---|---|---
| R | V | Type 2 PH of PCell | Oct 2
| R | V | Type 1 PH of Scell#1 | Oct 3
| R | V | Type 1 PH of Scell#2 | Oct 4
| PA ID | | PH of PA#1 | Oct 5
| PA ID | | PH of PA#2 | Oct 6
| R | R | PH of UE | Oct 7

FIG. 14

| R | R | Type 1 PH of PCell | Oct 1 |
|---|---|---|---|
| R | R | Type 2 PH of PCell | Oct 2 |
| CC ID | | Type 1 PH of Scell#1 | Oct 3 |
| CC ID | | Type 1 PH of Scell#2 | Oct 4 |
| PA ID | | PH of PA#1 | Oct 5 |
| PA ID | | PH of PA#2 | Oct 6 |
| R | R | PH of UE | Oct 7 |

FIG. 15

METHOD OF PERFORMING POWER HEADROOM REPORTING AND COMMUNICATION DEVICE THEREOF

CROSS REFERENCE TO RELATED APPLICATIONS

This application claims the benefit of U.S. Provisional Application No. 61/388,801, filed on Oct. 1, 2010 and entitled "Methods and System of Power Control in Multiple Component Carrier Systems", the contents of which are incorporated herein in their entirety.

BACKGROUND OF THE INVENTION

1. Field of the Invention

The application relates to a method utilized in a wireless communication system and a communication device thereof, and more particularly, to a method of performing power headroom reporting in a wireless communication system and a related communication device.

2. Description of the Prior Art

Long Term Evolution wireless communication system (LTE system), an advanced high-speed wireless communication system established upon the 3G mobile telecommunication system, supports only packet-switched transmission, and tends to implement both Medium Access Control (MAC) layer and Radio Link Control (RLC) layer in one single communication site, such as in Node B (NB) alone rather than in NB and RNC (Radio Network Controller) respectively, so that the system structure becomes simple.

The power headroom report is generated by a power headroom reporting (PHR) procedure, and is used to provide the serving eNB with information about the difference between the maximum UE transmission (TX) power and an estimated TX power for Uplink Share Channel (UL-SCH). With power headroom (PH) information sent by the UE, the network can allocate radio resource to the UE and make schedule decision more efficiently. In the PHR procedure, the UE uses a MAC control element in a MAC protocol data unit (PDU) to carry PH information.

Toward advanced high-speed wireless communication system, such as transmitting data in a higher peak data rate, LTE-Advanced system is standardized by the 3rd Generation Partnership Project (3GPP) as an enhancement of LTE system. LTE-Advanced system targets faster switching between power states, improves performance at the cell edge, and includes subjects, such as bandwidth extension, coordinated multipoint transmission/reception (COMP), uplink multiple input multiple output (MIMO), etc.

For bandwidth extension, carrier aggregation (CA) is introduced to the LTE-Advanced system for extension to wider bandwidth, where two or more component carriers are aggregated, for supporting wider transmission bandwidths (for example up to 100 MHz) and for spectrum aggregation. According to carrier aggregation capability, multiple component carriers are aggregated into overall wider bandwidth, where the UE can establish multiple links corresponding to the multiple (downlink and uplink) component carriers for simultaneously receiving and transmitting.

In carrier aggregation, the UE only has one RRC connection with the network. At RRC connection establishment/re-establishment/handover, one serving cell provides the NAS mobility information, and at RRC connection re-establishment/handover, one serving cell provides the security input. This cell is referred to as a Primary serving cell (PCell). In the downlink, the carrier corresponding to the PCell is the Downlink Primary Component Carrier (DL PCC) while in the uplink it is the Uplink Primary Component Carrier (UL PCC). In addition, cells other than the PCell are named secondary serving cell (SCell).

It is possible to configure a UE to aggregate a different number of CCs originating from the same eNB and of possibly different bandwidths in the UL and the DL. Note that, the number of DL CCs that can be configured depends on the DL aggregation capability of the UE, the number of UL CCs that can be configured depends on the UL aggregation capability of the UE, it is not possible to configure a UE with more UL CCs than DL CCs, and in typical TDD deployments, the number of CCs and the bandwidth of each CC in UL and DL is the same. In addition, the PCell is always configured with DL PCC and UL PCC, and the SCell can be configured only with DL SCC.

In LTE-A system (e.g. Rel-10), parallel PUCCH and PUSCH transmission have been supported. Consequently, eNB should take into account PUCCH and PUSCH transmission power contributing to the UE current transmission power, so as to assist eNB to schedule PUSCH and PUCCH. Note that, for uplink resource, the PCell has PUSCH and PUCCH, but SCell only has PUSCH.

For a UE supporting a single uplink component carrier in the LTE system, the UE reports a PHR only for the one uplink component carrier. For a UE supporting multiple uplink component carriers in the LTE-Advanced system, the UE has to report PHRs for multiple uplink component carriers. However, the network (e.g. eNB) may not well control transmission power for the uplink component carriers even if the network knows the power status of each uplink component carrier of the UE. Based on the TX architecture of the UE, multiple uplink component carriers may share the same power amplifier (PA). For example, a UE configured with one PA for TX is configured with two uplink component carriers. When a PHR is triggered, the UE reports PH information respectively for the component carriers to the network based on the concept of the LTE-Advanced and/or LTE system. Since the power resource of PA is shared by the two component carriers, if the UE allocates power resource for the first component carrier according to the PH information of the first component carrier without consideration of the PH information of the second component carrier, and allocates power resource for the second component carrier according to the PH information of the second component carrier without consideration of the PH information of the first component carrier, the sum of the allocated power resources for the first component carrier and the second component carrier may exceed power headroom of the PA. Thus, the UE shall not allocate power resource according to PH information of each component carrier due to PA power limitation.

SUMMARY OF THE INVENTION

The application discloses a method of performing PHR in a wireless communication system and a related communication device in order to solve the abovementioned problem.

A method of performing power headroom reporting, hereafter called PHR, for a communication device configured with a plurality of uplink component carriers or parallel PUCCH and PUSCH transmission in a wireless communication system is disclosed. The method comprises reporting power headroom information of at least one of the communication device, at least an uplink component carrier, and at least a power amplifier configured to the communication device, to a network of the wireless communication system when the PHR is triggered.

A method of performing power headroom reporting, hereafter called PHR, for a communication device configured with a plurality of uplink component carriers or parallel PUCCH and PUSCH transmission in a wireless communication system is disclosed. The method comprises reporting power headroom information of at least an uplink component carrier with a power limitation of the UE and/or a power headroom limitation of a power amplifier configured to the communication device for the at least an uplink component carrier when the PHR is triggered.

A method of handling power headroom report for a network in a wireless communication system is disclosed. The method comprises configuring a plurality of uplink component carriers or parallel PUCCH and PUSCH transmission to a communication device of the wireless communication system; and performing power control according to the power headroom report of at least one of at least a power amplifier configured to the communication device, the communication device, and at least an uplink component carrier, received from the communication device.

A method of handling power headroom report for a network in a wireless communication system is disclosed. The method comprises configuring a plurality of uplink component carriers or parallel PUCCH and PUSCH transmission to a communication device of the wireless communication system; and performing power control according to the power headroom report of at least an uplink component carrier with a power limitation of the UE and/or a power headroom limitation of a power amplifier configured to the communication device for the at least an uplink component carrier.

A communication device of a wireless communication system for performing power headroom reporting, hereafter called PHR, is disclosed. The communication device is configured with a plurality of uplink component carriers or parallel PUCCH and PUSCH transmission and comprises means for reporting power headroom information of at least one of the communication device, at least an uplink component carrier, and at least a power amplifier configured to the communication device, to a network of the wireless communication system when the PHR is triggered.

A communication device of a wireless communication system for performing power headroom reporting, hereafter called PHR, is disclosed. The communication device is configured with a plurality of uplink component carriers or parallel PUCCH and PUSCH transmission and comprises means for reporting power headroom information of at least an uplink component carrier with a power limitation of the UE and/or a power headroom limitation of a power amplifier configured to the communication device for the at least an uplink component carrier when the PHR is triggered.

A network of a wireless communication system for handling power headroom report is disclosed. The network comprises means for configuring a plurality of uplink component carriers or parallel PUCCH and PUSCH transmission to a communication device of the wireless communication system, and means for performing power control according to the power headroom report of at least one of at least a power amplifier configured to the communication device, the communication device, and at least an uplink component carrier, received from the communication device.

A network of a wireless communication system for handling power headroom report is disclosed. The network comprises means for configuring a plurality of uplink component carriers or parallel PUCCH and PUSCH transmission to a communication device of the wireless communication system, and means for performing power control according to the power headroom report of at least an uplink component carrier with a power limitation of the UE and/or a power headroom limitation of a power amplifier configured to the communication device for the at least an uplink component carrier.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 9-10 illustrate schematic diagrams of an aggregated PHR format with bitmap.

FIG. 11 illustrates a schematic diagram of an aggregated PHR format with component carrier identification.

FIG. 13 illustrates a schematic diagram of a PA based PHR format.

FIG. 14 illustrates a schematic diagram of an aggregated PHR format with PA identification.

FIG. 15 illustrates a schematic diagram of an aggregated PHR format with PA identification and component carrier identification.

DETAILED DESCRIPTION

Figure 1:
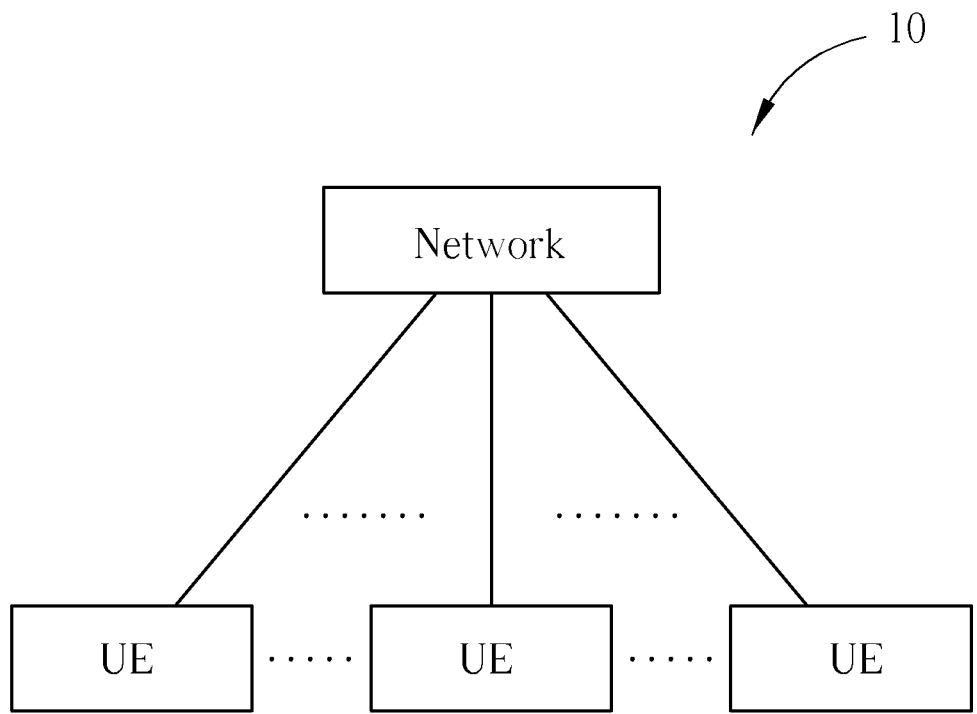
FIG. 1 illustrates a schematic diagram of an exemplary wireless communication system.

Please refer to FIG. 1, which is a schematic diagram of a wireless communication system 10. The wireless communication system 10 is a Long-Term Evolution advanced (LTE-A) system or other mobile communication systems, and is briefly composed of a network and a plurality of user equipments (UEs). In FIG. 1, the network and the UEs are simply utilized for illustrating the structure of the wireless communication system 10. Practically, the network may be an evolved universal terrestrial radio access network (E-UTRAN) comprising a plurality of evolved base stations (eNBs). The UEs can be devices such as mobile phones, computer systems, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 2:
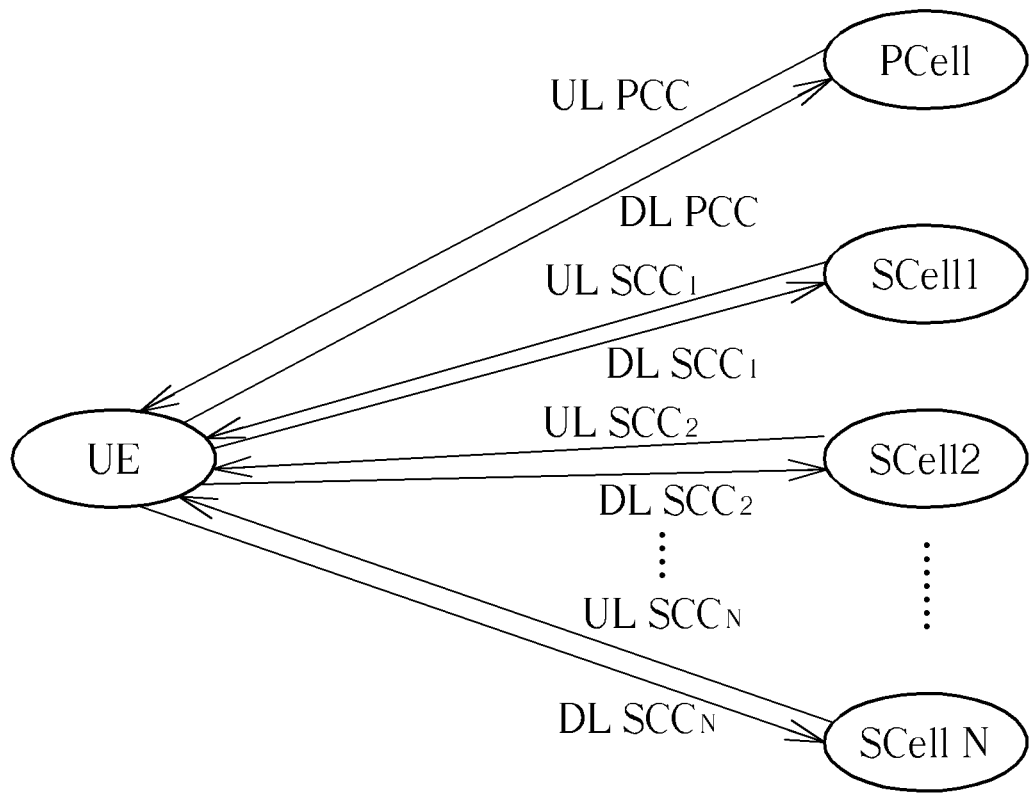
FIG. 2 is a schematic diagram of a user equipment and multiple cells under an eNB in a wireless communication system in FIG. 1.

Please refer to FIG. 2, which is a schematic diagram of a UE and multiple cells in the wireless communication system 10. The UE communicates with one primary serving cell (PCell) and several secondary serving cells (SCells), as SCell1-SCellN shown in FIG. 2. In the downlink, the component carrier corresponding to the PCell is the Downlink Primary Component Carrier (DL PCC) while in the uplink it is the Uplink Primary Component Carrier (UL PCC). Depending on UE capabilities, SCells can be configured to form together with the PCell a set of serving cells. In the downlink, the component carrier corresponding to a SCell is a Downlink Secondary Component Carrier (DL SCC) while in the uplink it is an Uplink Secondary Component Carrier (UL SCC). Note that, the PCell is always configured with DL PCC and UL PCC, and the SCell can be configured only with DL SCC.

Figure 3:
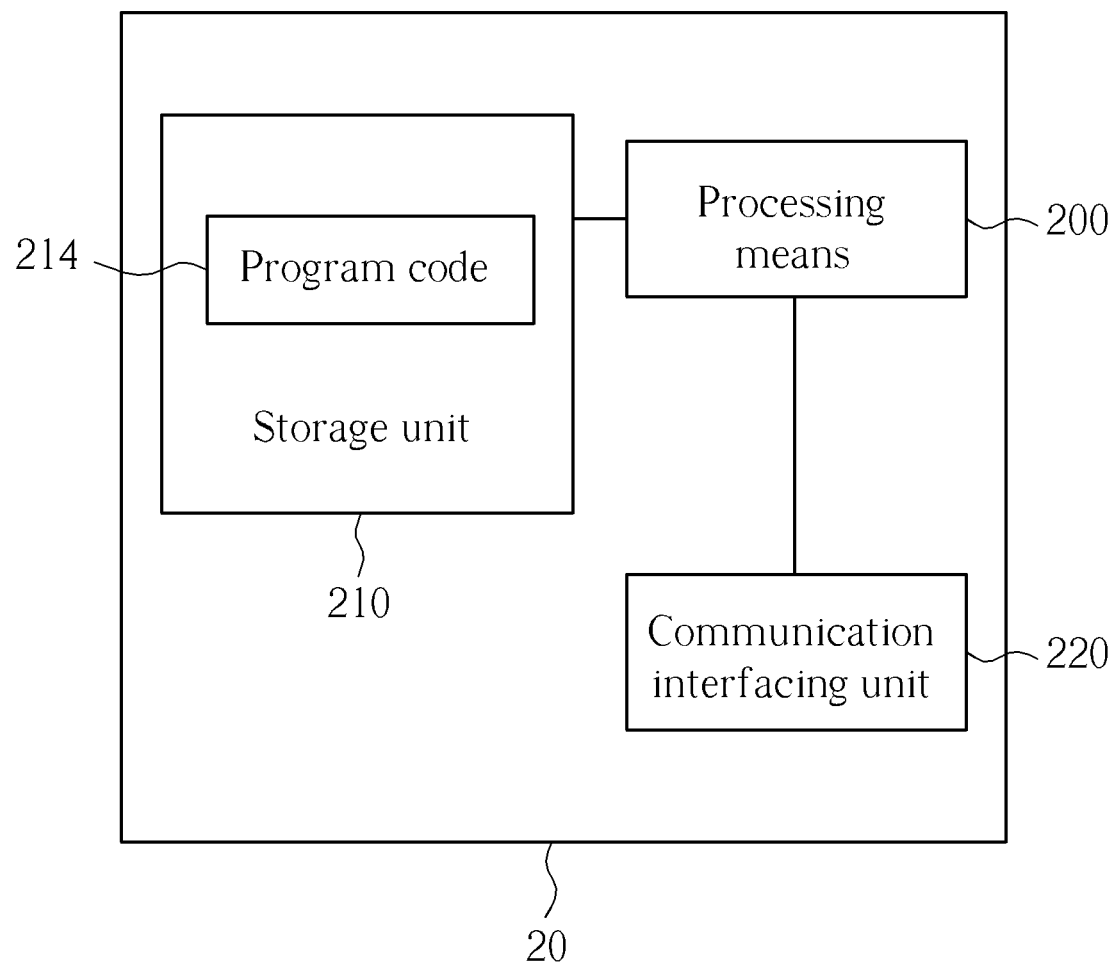
FIG. 3 illustrates a schematic diagram of an exemplary communication device.

FIG. 3 illustrates a schematic diagram of an exemplary communication device 20. The communication device 20 can be the UE shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange wireless signals with the network according to processing results of the processing means 200.

Figure 4:
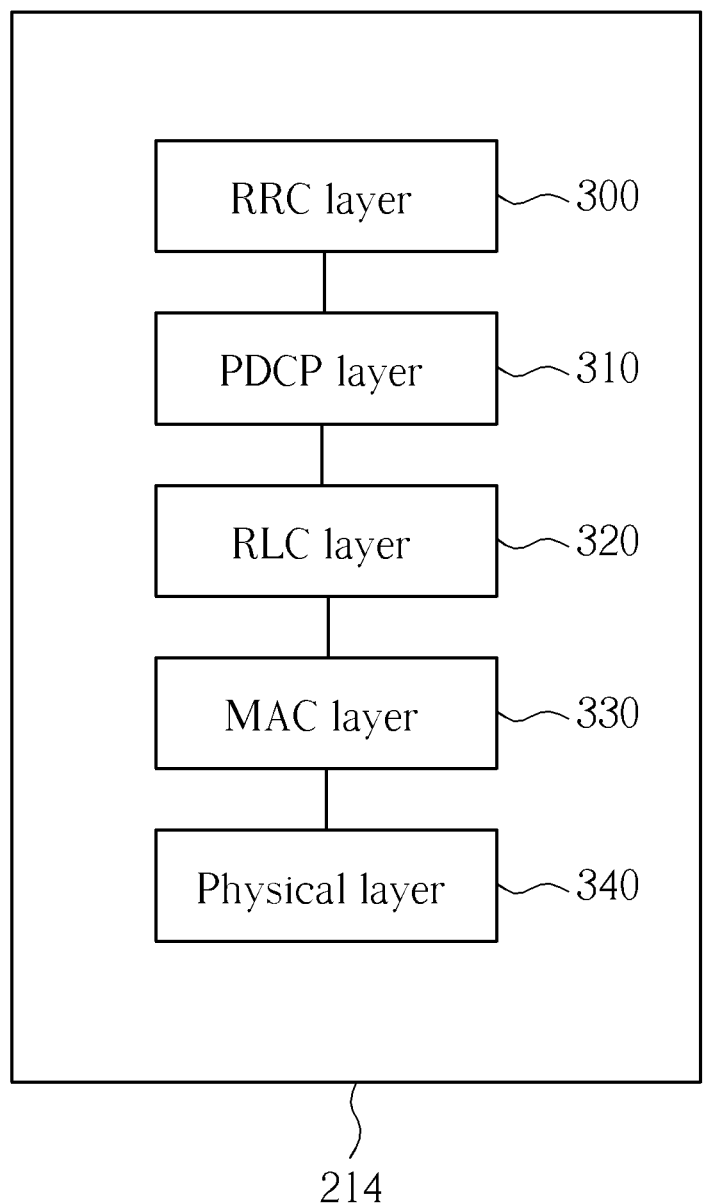
FIG. 4 illustrates a schematic diagram of communication protocol layers for an exemplary communication system.

Please refer to FIG. 4, which illustrates a schematic diagram of communication protocol layers for LTE-A system. The behaviors of some of the protocol layers may be defined in the program code 214 and executed by the processing means 200. The protocol layers from top to bottom are a radio resource control (RRC) layer 300, a packet data convergence protocol (PDCP) layer 310, a radio link control (RLC) layer 320, a medium access control (MAC) layer 330 and a physical (PHY) layer 340. The MAC layer 330 is responsible for generating a MAC PDU (Protocol Data Unit) including power headroom information when a power headroom reporting (PHR) is triggered.

As to UE transmission architecture, the UE may equip one or more radio frequency (RF) modules, RF chains, and/or power amplifiers (PAs) for RF signal transmission. Each RF module or PA may support one or more than one uplink component carriers. Therefore, power limitation of the RF module and/or PA shall be taken into consideration in LTE-A system. Otherwise, it is difficult to allocate power resource for each component carrier. Detailed description can be referred from above, so it is omitted herein. In some embodiments, the power limitation may be provided by a manufacturer of the UE or an antenna producer, and may be varied with different manufacturers or producers. In other embodiments, the minimum required power limitation may be defined in the technical specification, and UEs should be manufactured to meet at least the minimum requirements. Or, the power limitation of a PA may be the same as the UE maximum Output power (e.g., 23 dBm or 25 dBm). Besides, the power limitation may be adjusted by a dedicated signalling transmitted from the network (e.g. an eNB). In addition, since the UE supports multiple PAs, UE power limitation should be taken into consideration also. Otherwise, it is difficult to allocate power resource for each PA.

In order to enhance power control and resource management functionality of the network, the applicant provides several methods as following.

Figure 5:
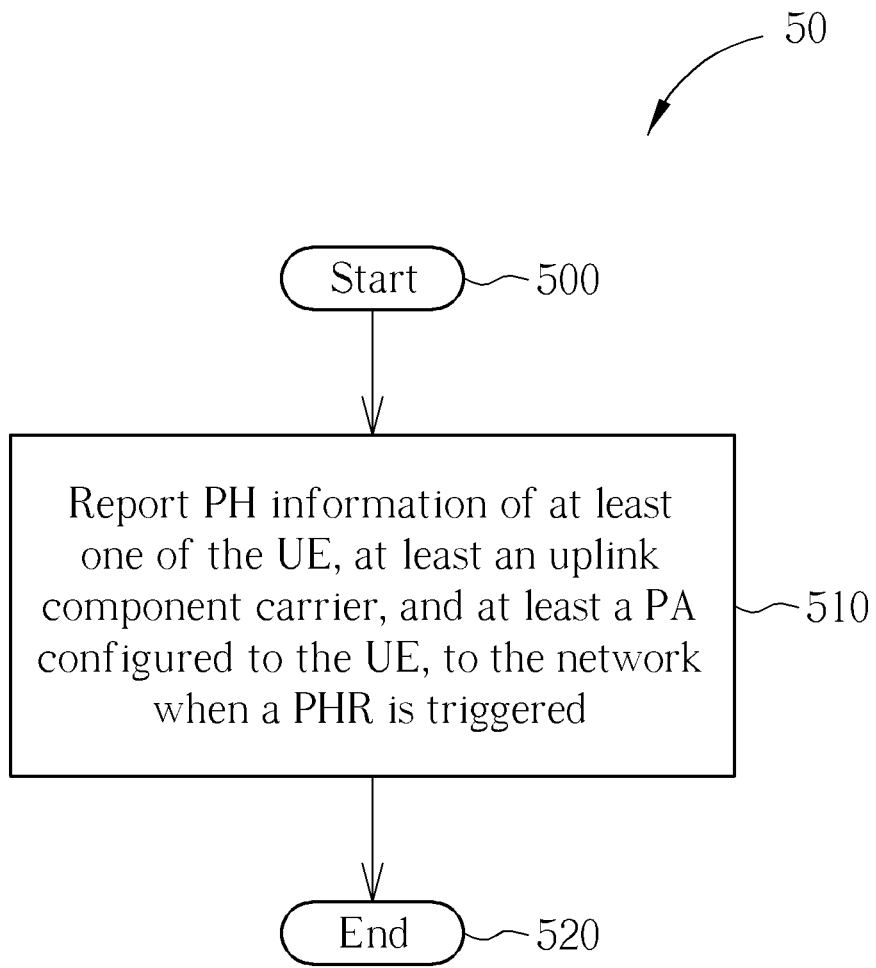
FIG. 5 is a flowchart of an exemplary process.

Please refer to FIG. 5, which illustrates a flowchart of an exemplary process 50. The process 50 is utilized in a UE configured with a plurality of uplink component carriers or parallel PUCCH and PUSCH transmission, for PH reporting. The process 50 can be compiled into the program code 214 and includes the following steps:

Step 500: Start.

Step 510: Report PH information of at least one of the UE, at least an uplink component carrier, and at least a PA configured to the UE, to the network when a PHR is triggered.

Step 520: End.

According to the process 50, the UE reports at least one of PH information of the UE, PH information of the uplink component carrier, and PH information of the PA when the PHR is triggered. Therefore, the network (e.g. an eNB) can control the uplink transmission power and/or manage uplink resource (e.g. resource block (RB) assignment, modulation and coding scheme (MCS)) based on the PH information of at least one UE, PA, and uplink component carrier.

Note that, the PHR may be triggered upon configuration or reconfiguration of the power headroom reporting functionality by upper layers (e.g. RRC layer 300). In addition, the network may configure UE a timer (e.g. periodicPHR-Timer). When the timer expires, the PHR is triggered. Besides, the network may configure UE a timer (e.g. prohibit-PHR-Timer). When the timer expires or has expired and the path loss has changed more than a threshold for at least one activated Serving Cell which is used as a pathloss reference since the last transmission of a PHR when the UE has UL resources for new transmission, the PHR is triggered.

Moreover, the PHR may be triggered when a SCell (with uplink component carrier) is added (configured) and/or removed (de-configured). In addition, the PHR may be triggered when a SCell with configured UL component carrier is activated. In addition, the network may configure UE a timer (e.g. periodicPA_PHR-Timer) for the configured PA. When the timer expires, the PHR is triggered, and/or the UE reports the PH information for the corresponding PA. Besides, the network may configure UE a timer (e.g. periodicUE_PHR-Timer) for a UE. When the timer expires, the PHR is triggered, and/or the UE reports the UE PH information.

Figure 6:
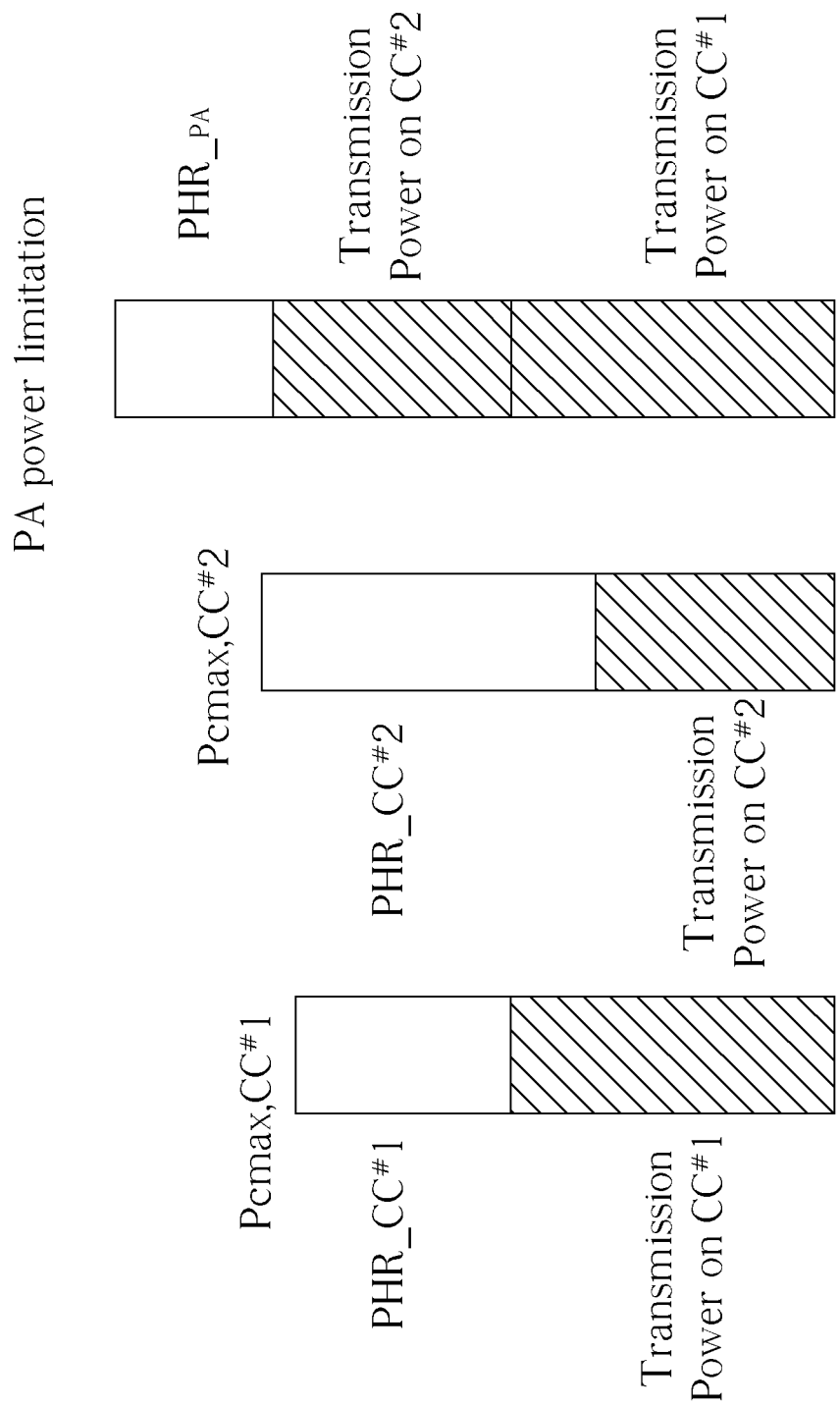
FIG. 6 illustrates a schematic diagram of PH reporting for a power amplifier and a component carrier.

For clearly understanding the concept of the present invention, please refer to FIG. 6, which illustrates PH reporting for a PA and uplink component carriers CC#1 and CC#2 corresponding to the PA. In FIG. 6, the UE reports PH information of the uplink component carrier CC#1 and CC#2 and PH information of the PA. PH information of the component carrier CC#1 includes a PH value PHR_CC#1 indicating the difference between component carrier maximum (configured) transmission power Pcmax_CC#1 and transmission power on component carrier CC#1, PH information of component carrier CC#2 includes a PH value PHR_CC#2 indicating the difference between component carrier maximum (configured) transmission power Pcmax_CC#2 and transmission power on component carrier CC#2, and PH information of the PA includes a PH value PHR_PA indicating the difference between PA maximum (configured) transmission power $P_{PA\_max}$ and transmission power on component carrier CC#1 and CC#2. With PH information of the PA (i.e. the PH value PHR_PA), the network is able to allocate suitable power resource for both of the component carriers CC#1 and CC#2 without exceeding the power headroom limitation of the PA.

For example, the UE reports that the PH value PHR_CC#1 is 100 mW, the PH value PHR_CC#2 is 100 mW, and the PH value PHR_PA is 150 mW, to the network. In this situation, the network may allocate 75 mW for each of the component carriers CC#1 and CC#2 since the allocated power resource for the component carriers CC#1 and CC#2 shall not exceed 150 mW.

Figure 7:
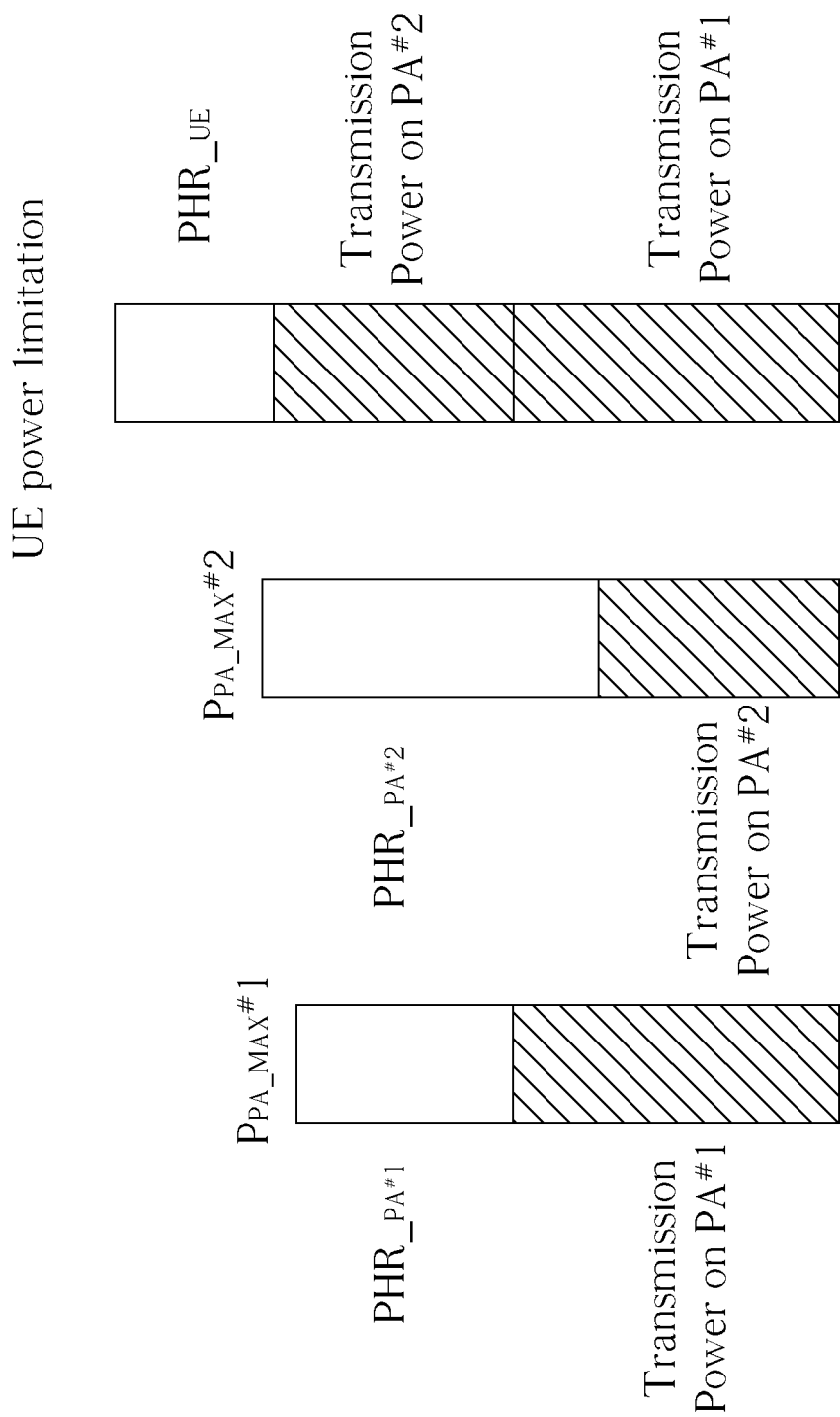
FIG. 7 illustrates a schematic diagram of PH reporting for a user equipment and a power amplifier.

On the other hand, please refer to FIG. 7, which illustrate PH reporting for a UE and PAs PA#1 and PA#2. In FIG. 7, the UE reports PH information (e.g. $P_{PA\_MAX\#}1$ and $P_{PA\_MAX\#}2$) of PA PA#1 and PA#2, and PH information (e.g. PHR_UE) of the UE. Therefore, the network can allocate suitable power resource for both of the PAs PA#1 and PA#2 without exceeding the power headroom limitation of the UE.

Take an example based on the process 50. Assume that the UE is configured with one PCell and two SCells (i.e. SCell#1 and SCell#2 in FIG. 2) which all are configured with uplink component carrier. In addition, the UE is equipped with two PAs PA#1 and PA#2. The UE shall report PH information for PCell, SCell#1, SCell#2, PA#1, PA#2, and the UE in a MAC CE or separate MAC CEs of a MAC PDU. Note that, the PCell has PUSCH and PUCCH resource, which can be referred from the prior art, so within the MAC CE, the UE reports PH information of the PUSCH (called Type 1 PH) and PH information of the PUCCH (called Type 2 PH) on the PCell.

Figure 8:
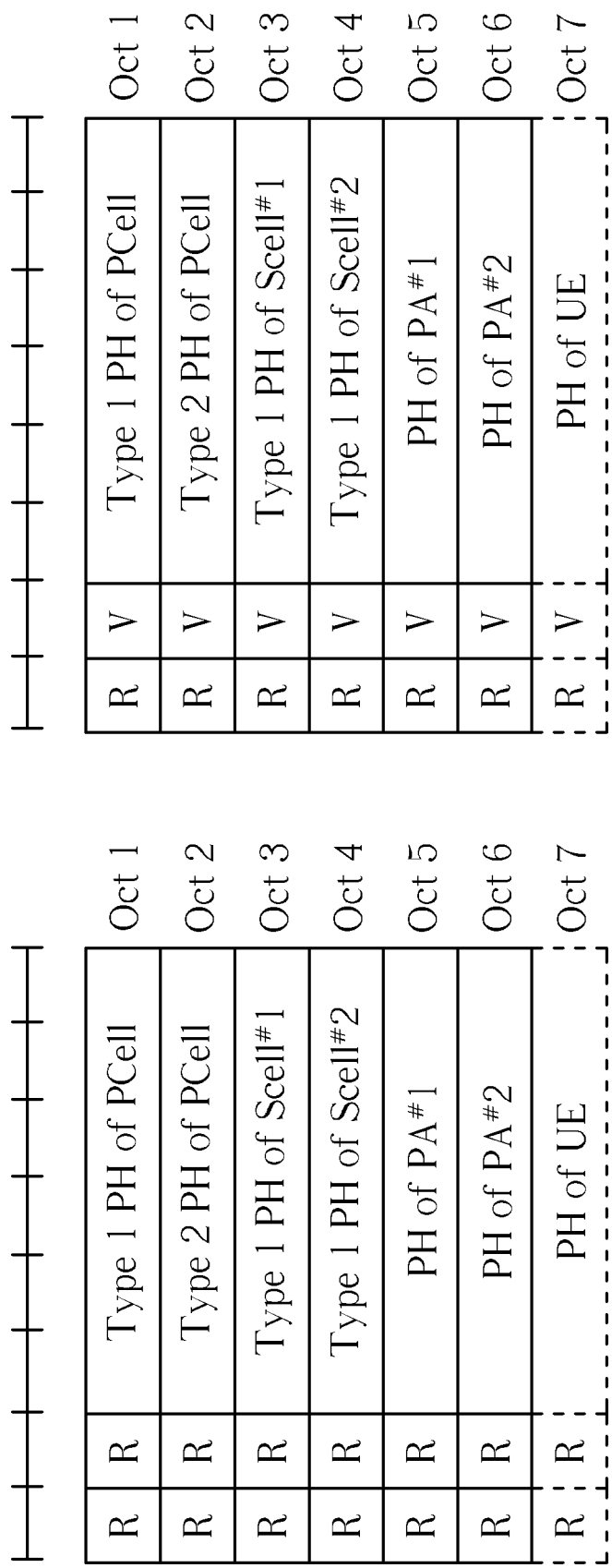
FIG. 8 illustrates a schematic diagram of an aggregated PHR format.

As to PHR MAC CE format, please refer to FIGS. 8-15. FIG. 8 illustrates an aggregated PHR format according to a first embodiment. In this embodiment, the PH information for PCell, SCell#1 and SCell#2, PAs and/or UE are aggregated in the same MAC CE. In FIG. 8, the PH fields may indicate the power headroom level for the PCell, SCell#1 and SCell#2, PA and/or UE, and may be in a pre-defined order. In addition, a Virtual field (e.g. 1 bit) may be used to indicate if the PH value is based on a real transmission or a virtual PH format (e.g., a reference format). The virtual PH format may be used when there is no real UL transmission on the corresponding PCell, SCell#1, SCell#2, PA, and/or UE.

In addition, a MAC subheader corresponding to the MAC CE is necessary, wherein the MAC subheader includes a logic channel identity (LCID) field to indicate that the corresponding MAC control element is used for PH reporting. Besides, the MAC subheader may include a reserved field, which is reserved for future use, a extension field to indicate if more field are present in the MAC header or not, a length field to indicate the length of the MAC CE, a format field to indicate the size of the length, a PH field to indicate the power headroom level.

Please refer to FIG. 9, which illustrates an aggregated PHR format with bitmap according to a second embodiment. In this embodiment, a bitmap is used for indicating the absence of PH information of a PA (e.g. PA#1 and PA#2), the absence of PH information of SCell#1 and SCell#2, and/or the absence of PH information of the UE. The PH fields may indicate the power headroom level for the PCell, SCell#1 and SCell#2, PA and/or UE, and may be in a pre-defined order. In addition, a Virtual field may be used to indicate if virtual PH information (e.g., a virtual PH reference format) is used.

Please refer to FIG. 10, which illustrates an aggregated PHR format with bitmap according to a third embodiment. In this embodiment, a bitmap may be used for providing the mapping between the uplink component carriers and the corresponding PAs and/or RF modules. For example, the component carriers CC#0 and CC#2 maps to the same PA (e.g. the PA#1), and the component carrier CC#1 maps to the PA#2. Note that, 8-bit bitmap is illustrated in FIG. 10. However, the number of bits for a bitmap is not limited to be 8 bits.

Please refer to FIG. 11, which illustrates an aggregated PHR format with component carrier identification according to a fourth embodiment. In this embodiment, the PH of uplink component carriers mapped to a PA is followed by the PH of the corresponding PA. In addition, the PH of each component carrier may be attached with its component carrier identification (as CC ID in FIG. 11), and the PH of the PA may be also attached with a CC ID, which may represent the starting point CC ID. Those component carriers in this PHR MAC CE listed from the starting point CC ID to the PH of the corresponding PA may be mapped to this PA. Note that, 2-bit CC ID is illustrated in FIG. 11. However, the number of bits for CC ID is not limited to be 2 bits.

In some embodiments, the mapping information may be provided when an uplink component carrier is configured to the UE. For example, the network sends a message to configure (or add) one (or more) SCell including uplink resource (e.g. uplink channels, uplink carriers, uplink subframes, etc.) to the UE, and this message includes the mapping information between PAs and configured uplink component carriers. Besides, this message may indicate which PA the configured uplink component carriers should use, and/or include one (or more) PA identification for each configured uplink component carrier. Note that, before the mapping information transmission, capability information of the UE (e.g. RF Tx architecture, the number of PAs, etc) may be provided to the network.

On the other hand, after receiving the SCell configuration message, the UE may respond with a message to indicate that the configuration is completed. In some embodiments, this message may include the mapping information between PAs and configured uplink component carriers. Besides, this message may indicate which PA the configured uplink component carriers should use, and/or include one (or more) PA identification for each configured uplink component carrier.

Figure 12:
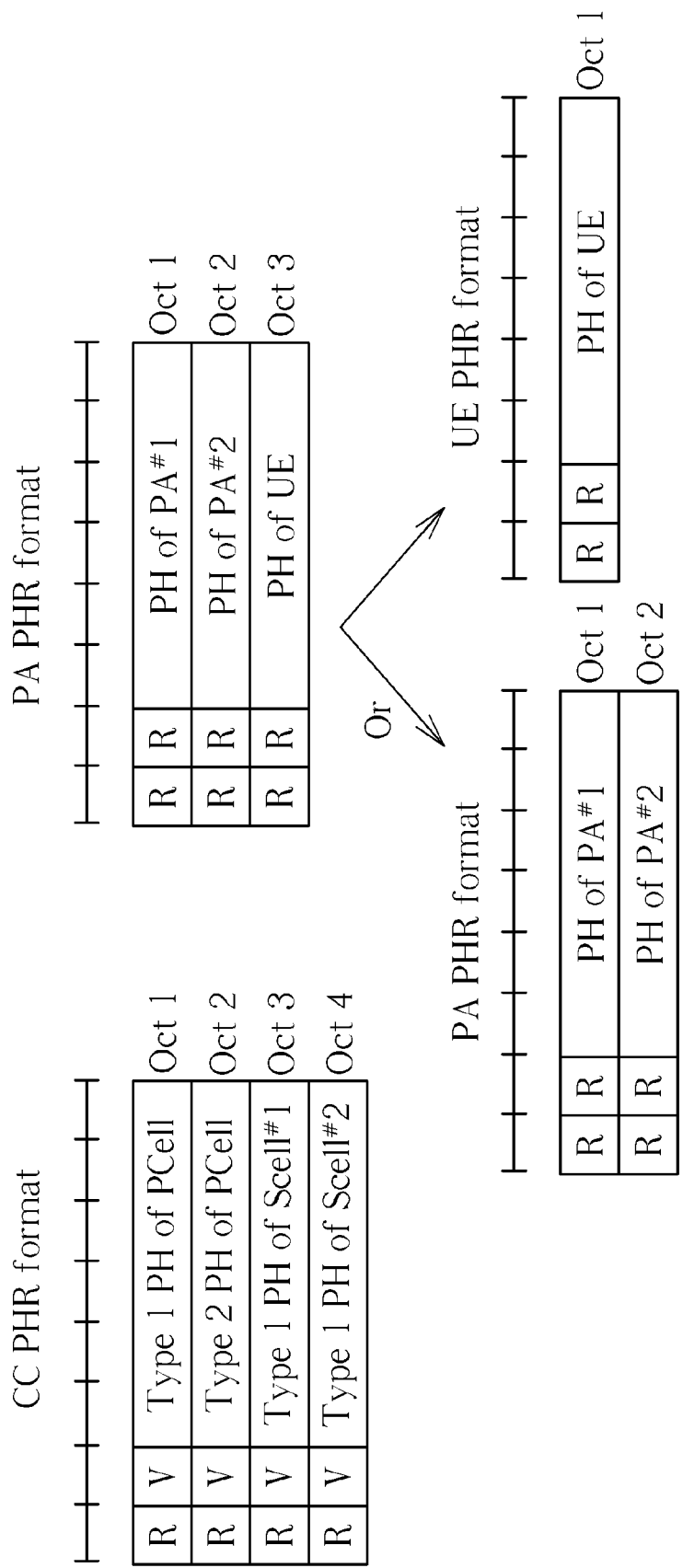
FIG. 12 illustrates a schematic diagram of a separate PHR format.

Please refer to FIG. 12, which illustrates a separate PHR format according to a fifth embodiment. In this embodiment, one MAC CE is used for component carrier PH reporting, one for PA PH reporting, and/or one for UE PH reporting. On the other hand, LCIDs in corresponding MAC subheaders may be used to differentiate the different MAC CEs. For example, one LCID may be used for component carrier PH report, one LCID may be used for PA PH report, and/or one LCID may be used for UE PH report. These MAC CEs may be included by the same MAC PDU and/or may be transmitted at the same time and/or may be transmitted on the same component carrier.

FIG. 13 illustrates a schematic diagram of a PA based PHR format according to a sixth embodiment. In this embodiment, the PHR MAC CE includes the PHR of uplink component carriers mapped to the same PA (e.g. PA#1), the PHR of the PA, and/or the PHR of the UE. Note that, a PA identification PA_ID may be included in the PHR report (e.g. in the MAC subheader and/or MAC CE).

FIG. 14 illustrates a schematic diagram of an aggregated PHR format with PA identification according to a seventh embodiment. In this embodiment, the PHR of PAs may be attached with a PA identification PA ID. In addition, FIG. 15 illustrates a schematic diagram of an aggregated PHR format with PA identification and component carrier identification according to an eighth embodiment. In this embodiment, the PH information for each component carrier and/or PA may be attached with a component carrier identification CC ID and/or PA identification PA ID respectively.

Please note that, PHR MAC CE may not in the same format with different scenarios and/or different time (e.g. TTIs, subframes). In some embodiments, a used format of the MAC CE may be determined by the network. For example, the network may send a message to the UE, to explicitly indicate a format of the MAC CE the UE should use. Besides, the network or the UE may determine a adopted format of the MAC CE based on whether a SCell is configured, whether parallel PUCCH and PUSCH transmission is supported or configured, and/or a version (e.g. 3GPP release 8, 9, 10 or later version) of the network.

For PH estimation, a PH value of a component carrier (hereafter called PH(CC)), a PH value of a PA (hereafter called PH(PA)), and/or PH value of the UE (hereafter called PH(UE)) included in PH information may be estimated based on at least one of the following parameters:

1. The (configured) CC transmitted power (e.g. $P_{CMAX,C}$);
2. The (configured) maximum PA output power (e.g. $P_{PA\_MAX}$);
3. The maximum power reduction (i.e. MPR);
4. The additional maximum power reduction (i.e. A-MPR);
5. The transmission power for PUCCH;
6. The transmission power for PUSCH;
7. The (configured) UE maximum output power (e.g., UE Power Class, $P_{powerclass}$);
8. Maximum allowed UE output power signalled by higher layers. (e.g., $P_{EMAX}$, P-max);
9. The number of uplink component carriers (mapped to the same PA);
10. Channel bandwidth.

The detailed description or definition of the abovementioned parameters can be referred to 3GPP TS 36.101 specification.

For example, the PH(CC) may be estimated by the following formula:

1. Type 1 PH: $P_{CMAX,C}$–PUSCH power;
2. Type 2 PH: $P_{CMAX,C}$–PUCCH power–PUSCH power;

wherein the $P_{CMAX,C}$ may be set within a bound. For example, $P_{CMAX\_L, C} \leq P_{CMAX, C} \leq P_{CMAX\_H, C}$, where $P_{CMAX\_L, C}$=MIN $\{P_{EMAX, C}-\Delta T_C, P_{PowerClass}-MPR-A-MPR-\Delta T_C\}$, or $P_{CMAX\_L, C}$=MIN $\{P_{EMAX, C}-\Delta T_C, P_{PA\_MAX}-MPR-A-MPR-\Delta T_C\}$, or $P_{CMAX\_L, C}$=MIN $\{P_{EMAX, C}-\Delta T_C, P_{PowerClass}-MPR-A-MPR-\Delta T_C, P_{PA\_MAX}-MPR-A-MPR-\Delta T_C\}$, and $P_{CMAX\_H, C}$=MIN $\{P_{EMAX, C}, P_{PowerClass}\}$, or $P_{CMAX\_H, C}$=MIN $\{P_{EMAX, C}, P_{PA\_MAX}\}$.

In some embodiments, PH(CC) may be estimated based on the PH of the corresponding PA and/or the PH of another component carrier. For example, PH(CC#1) may be estimated by the following formula:

1. Type 1: $P_{CMAX,C}$–PUSCH power; and
2. Type 2: $P_{CMAX,C}$–PUCCH power–PUSCH power.

But PH(CC#2) may be estimated by formula:

1. Type 1: min$\{P_{CMAX,C}$–PUSCH power, PHR_PA–PHR_CC#1$\}$; and
2. Type 2: min$\{P_{CMAX,C}$–PUCCH power–PUSCH power, PHR_PA–PHR_CC#1$\}$.

In some embodiments, the real PH information for a component carrier may be omitted in the following cases. In the first case, a real PUCCH PH information is omitted if there is no transmission on the corresponding PUCCH. In the second case, a real PUSCH PH information may be omitted if there is no transmission on the corresponding PUSCH. Or, if the uplink component carrier is deactivated, if there is only one (activated) uplink component carrier in the UE), if the PH value of the uplink component carrier or a sum of PH values of the uplink component carriers mapped to the same PA is more than or equal to the PH value of the PA, if the (sum of) PH value of the component carrier is more than or equal to the PH value of the UE, and/or if the network provided a signalling to indicate the disable (or stop) of the real PH reporting for the component carrier, the real PH information is omitted. In any of the abovementioned cases, an indicator included in the MAC PDU to indicate the absence of the real PH information may be used.

On the other hand, a virtual PH information (e.g., a virtual PH reference format) for a component carrier may be reported in the following cases. In the first case, a virtual PUCCH PH information is reported if there is no transmission on the corresponding PUCCH. In the second case, a virtual PUSCH PH information may be reported if there is no transmission on the corresponding PUSCH. Or, if the uplink component carrier is deactivated, if there is only one (activated) uplink component carrier in the UE), if the PH value of the uplink component carrier or a sum of PH values of the uplink component carriers mapped to the same PA is more than or equal to the PH value of the PA, if the (sum of) PH value of the component carrier is more than or equal to the PH value of the UE, and/or if the network provided a signalling to indicate the use of virtual PH reporting for the component carrier, a virtual PH information is reported. In any of the abovementioned cases, an indicator (e.g. a bit in Virtual field of the MAC CE) may be included in the MAC PDU to indicate that the virtual PH information is used.

On the other hand, the PH(PA) may be estimated by the following formula:

1. $P_{PA\_MAX}$–the sum of transmission power of (all) CCs mapped to this PA;
2. $P_{PA\_MAX}$–the sum of (MPR+AMPR+transmission power) of (all) CCs mapped to this PA;
3. $P_{PA\_MAX}$–(MPR+AMPR)–the sum of (transmission power) of (all) CCs mapped to this PA; wherein the $P_{PA\_MAX}$ may be $P_{EMAX}$/the number of (using) PAs, or the UE maximum output power/the number of (using) PAs, or the $P_{PA\_MAX}$ may be set within a bound. For example, $P_{PA\_MAX\_L} \leq P_{PA\_MAX} \leq P_{PA\_MAX\_H}$. Note that, the estimated PH(PA) may corresponding to a value in a predefined table stored in the UE, and the UE can report this value to the network with PH information of the PA. In addition to the PH value indication, some values in the predefined table may be further used for other purpose.

Moreover, in some embodiments, the real PH information for a PA may be omitted or a virtual PH information for a PA may be reported if there is only one (scheduled and/or activated) uplink component carrier using this PA, if there is only one (activated) PA in the UE, if the sum of PH values of corresponding uplink component carriers is less than or equal to the PH value of the PA, if the PH value of the PA is more than or equal to the PH value of the UE, and/or if the network provided a signalling to disable (or stop) the real PH reporting of the PA or to indicate the use of virtual PH information for the PA. In any of the abovementioned situation, an indicator (e.g. a bit in Virtual field of the MAC CE, or a bitmap) may be included in the MAC PDU to indicate whether the real PH information for the PA is absent or whether the virtual PH information is used.

In addition, the PH(UE) may be estimated by the following formula:

1. $P_{UE\_MAX}$–the sum of transmission power of (all) component carriers;
2. $P_{UE\_MAX}$–the sum of (MPR+AMPR+transmission power) of (all) component carriers; and
3. $P_{UE\_MAX}$–(MPR+AMPR)–the sum of (transmission power) of (all) component carriers; wherein the $P_{UE\_MAX}$ may be the (configured) UE maximum output power (e.g. UE Power Class, $P_{powerclass}$), or maximum allowed UE output power signalled by higher layers. (e.g. $P_{EMAX}$, P-max), or set within a bound, such as $P_{UE\_MAX\_L} \leq P_{UE\_MAX} \leq P_{UE\_MAX\_H}$.

In some embodiments, the real PH information for the UE may be omitted or a virtual PH information for the UE may be reported if there is no data (or no power) transmitted, if there is only one (scheduled and/or activated) CC in the UE, if there is only one (activated) PA in the UE, if the sum of PH values of corresponding (UL) CCs is less than or equal to the PH value of the UE, if the sum of PH values of corresponding PAs is less than or equal to the PH value of the UE, if the network provided a signalling to disable (or stop) the real PH reporting of the UE or to indicate the use of virtual PH reporting of the UE. In any of the abovementioned situation, an indicator (e.g. a bit in Virtual field of the MAC CE, or a bitmap) may be included in the MAC PDU to indicate whether the real PH information for the UE is absent or whether the virtual PH information is used.

Figure 16:
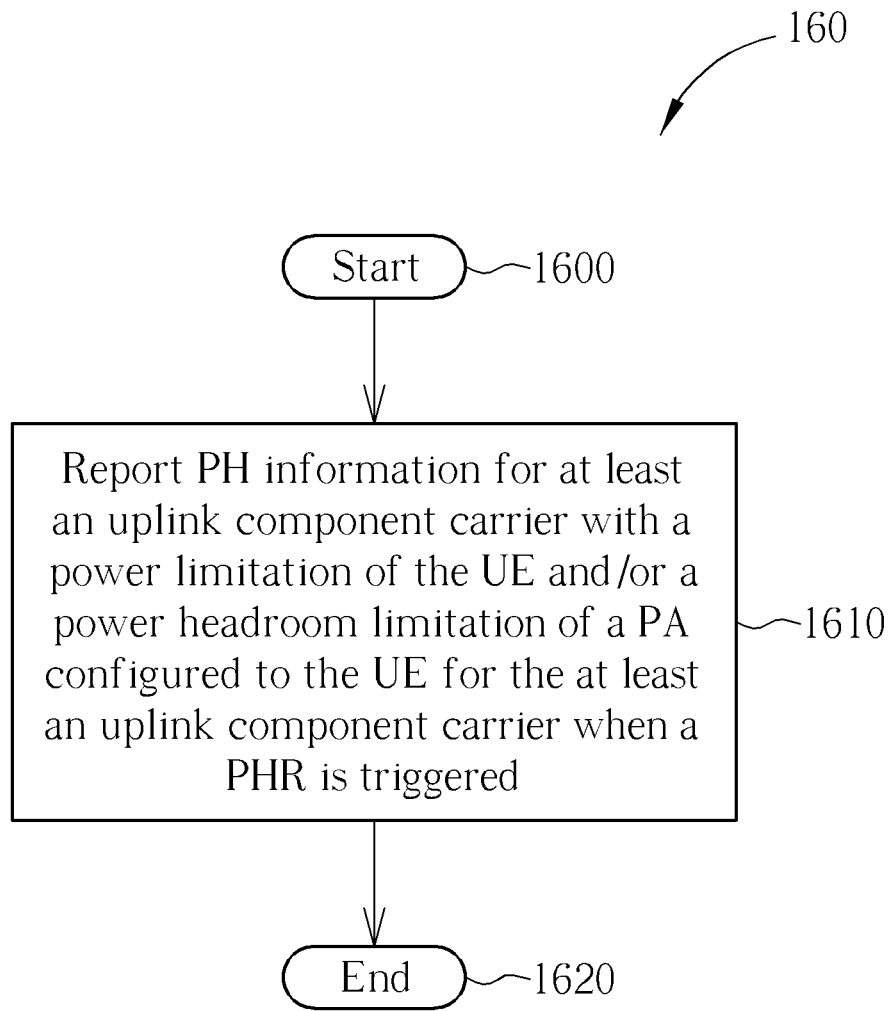
FIG. 16 is a flowchart of an exemplary process.

Please refer to FIG. 16, which illustrates a flowchart of an exemplary process 160. The process 160 is utilized in a UE configured with a plurality of uplink component carriers or parallel PUCCH and PUSCH transmission, for PH reporting. The process 160 can be compiled into the program code 214 and includes the following steps:

Step 1600: Start.

Step 1610: Report PH information for at least an uplink component carrier with a power limitation of the UE and/or a power headroom limitation of a PA configured to the UE for the at least an uplink component carrier when a PHR is triggered.

Step 1620: End.

According to the process 160, the UE reports the PH information of the uplink component carriers with consideration of PH limitation of the PA (e.g. generating and transmitting a reduced or simplified PH report for the PA to the network). Or, the UE may not report PH information of PA to the network. Thus, the network schedules resource according to PH information of each component carrier.

Take an example based on the process 160. Please refer to FIG. 17, which illustrates a schematic diagram of a PH reporting according to a first embodiment. Assume that the PH value PHR_CC#1 is 50 mW, the PH value PHR_CC#2 is 80 mW, and the PH value PHR_PA is 150 mW. In this situation, the sum of PH values of corresponding uplink component carriers is less than the PH value of the corresponding PA. The UE may not report the PH information of the PA to the network.

Figure 18:
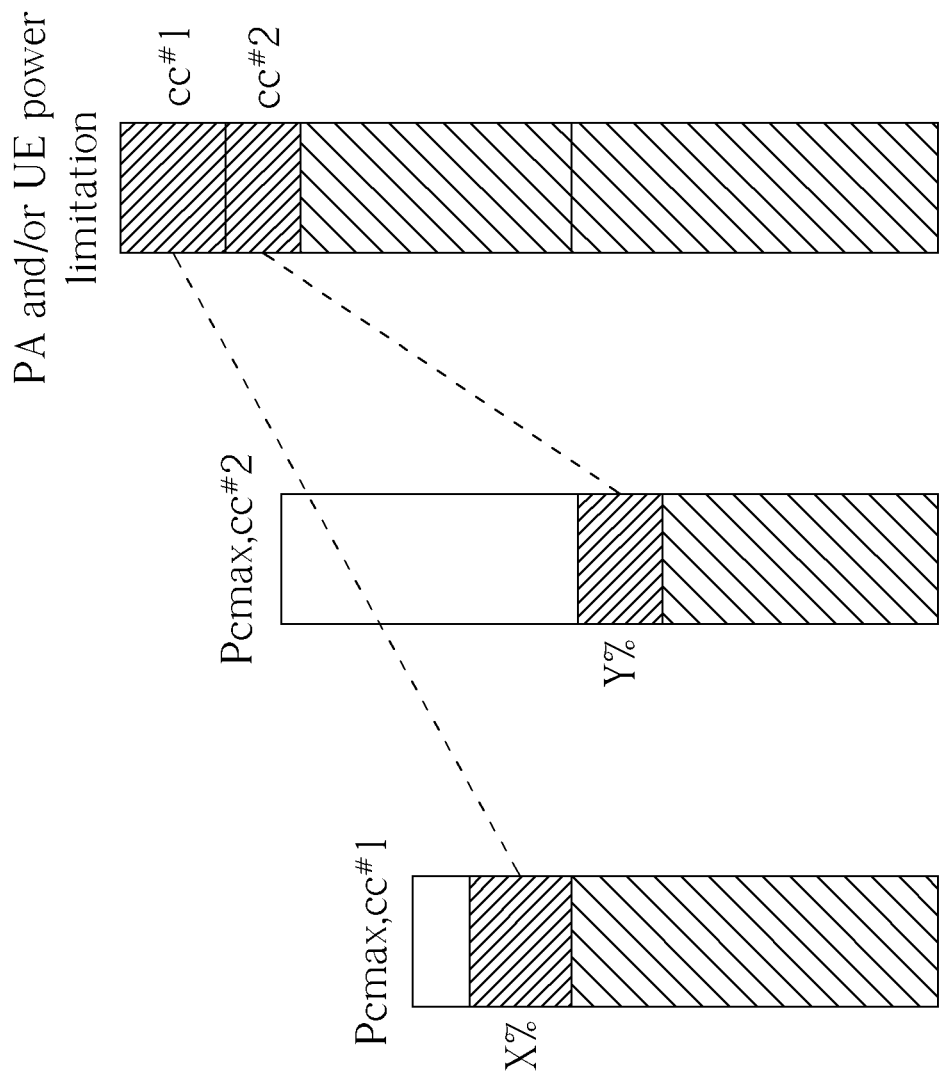
FIG. 18 illustrates a schematic diagram of a PH reporting according to a second embodiment.
Figure 19:
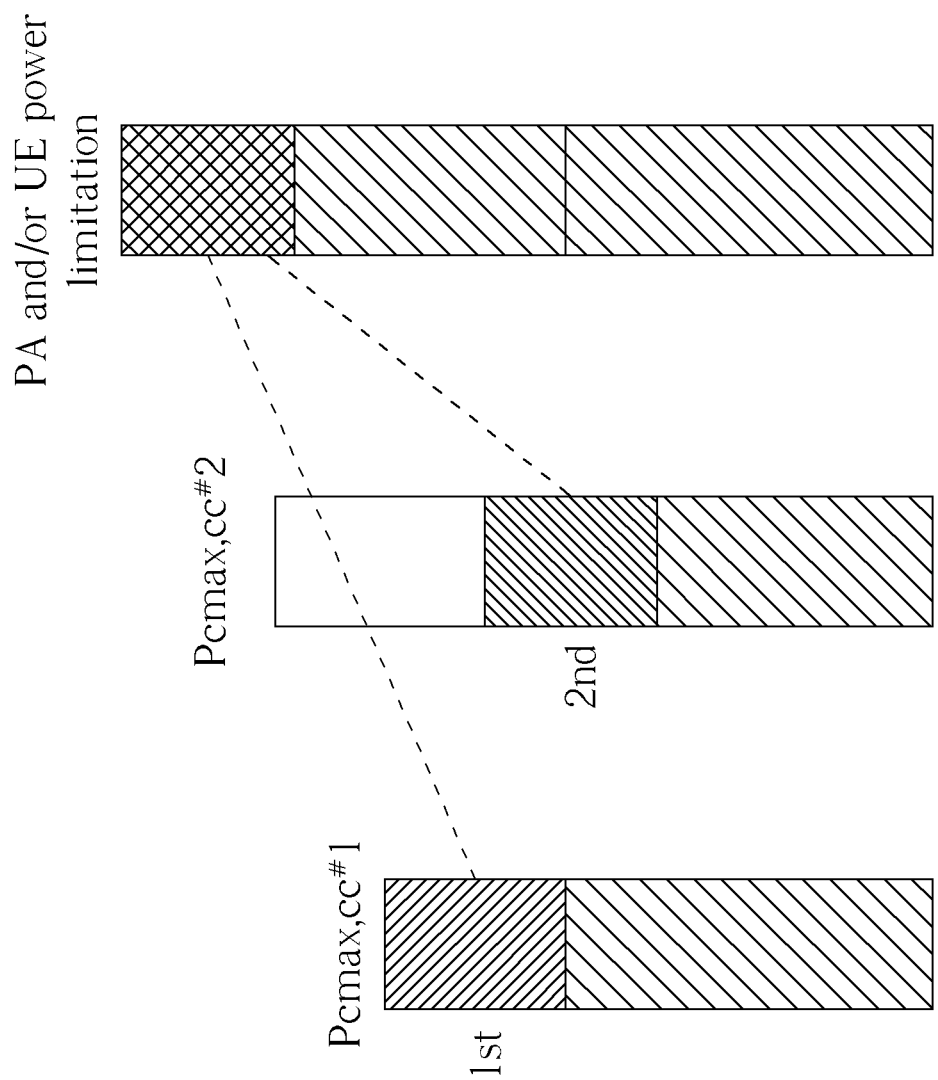
FIG. 19 illustrates a schematic diagram of a PH reporting according to a third embodiment.

In addition, please refer to FIG. 18, which illustrates a schematic diagram of a PH reporting according to a second embodiment. Assume that the PH value PHR_CC#1 is 100 mW, the PH value PHR_CC#2 is 100 mW, and the PH value PHR_PA is 150 mW. In this situation, the UE may report PH value PHR_CC#1 is 75 mW and PH value PHR_CC#2 is 75 mW. Thus, the network schedules resource for the component carriers CC#1 and CC#2 without exceeding PA power limitation. On the other hand, the network and/or UE may determine that different component carriers with different resource weight or percentage (e.g. as X % and Y % in FIG. 18). For example, the network and/or UE determines that the resource weight for the component carrier CC#1 is $\frac{3}{5}$ and for the component carrier CC#2 is $\frac{2}{5}$. Then, the UE reports that the PH value PHR_CC#1 is 90 mW (i.e. 150×$\frac{3}{5}$=90 mW) and PH value PHR_CC#2 is 60 mW, to the network. Or, the network and/or UE may further take priority of the component carriers CC#1 and CC#2 into consideration. For example, the network and/or UE determines that the priority of the component carrier CC#1 is higher than the component carrier CC#2 as shown in FIG. 19. The UE reports that the PH value PHR_CC#1 is 100 mW and PH value PHR_CC#2 is 50 mW, to the network. Thus, the network can allocate suitable power resource for each component carrier without exceeding the PA power limitation.

Figure 17:
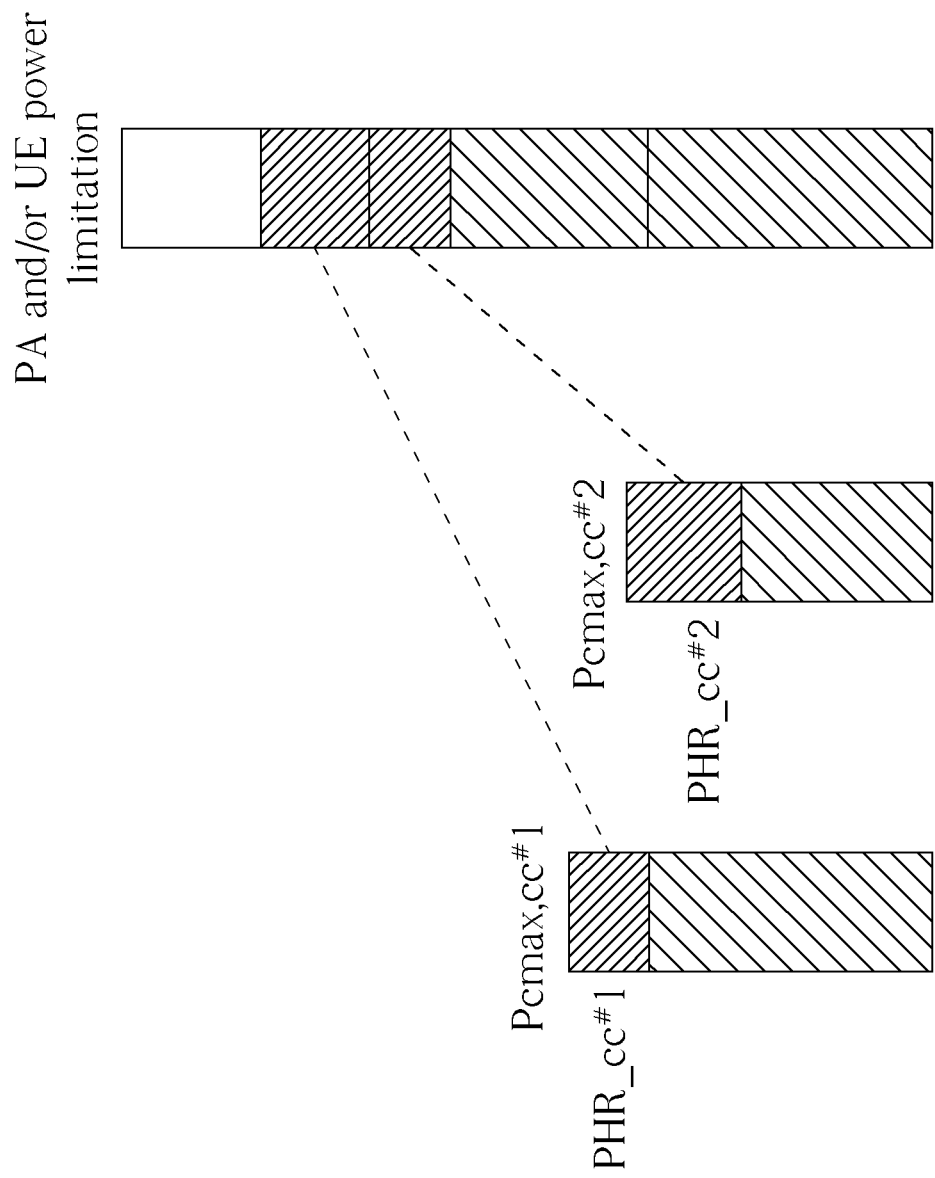
FIG. 17 illustrates a schematic diagram of a PH reporting according to a first embodiment.

Please note that, the abovementioned examples of FIGS. 17-19 are also applied for the PA PHR. Thus, the UE does not report a sum of PH values of PAs exceeding the UE power limitation. In addition, the UE may not need to report PH information of UE to the network.

Figure 20:
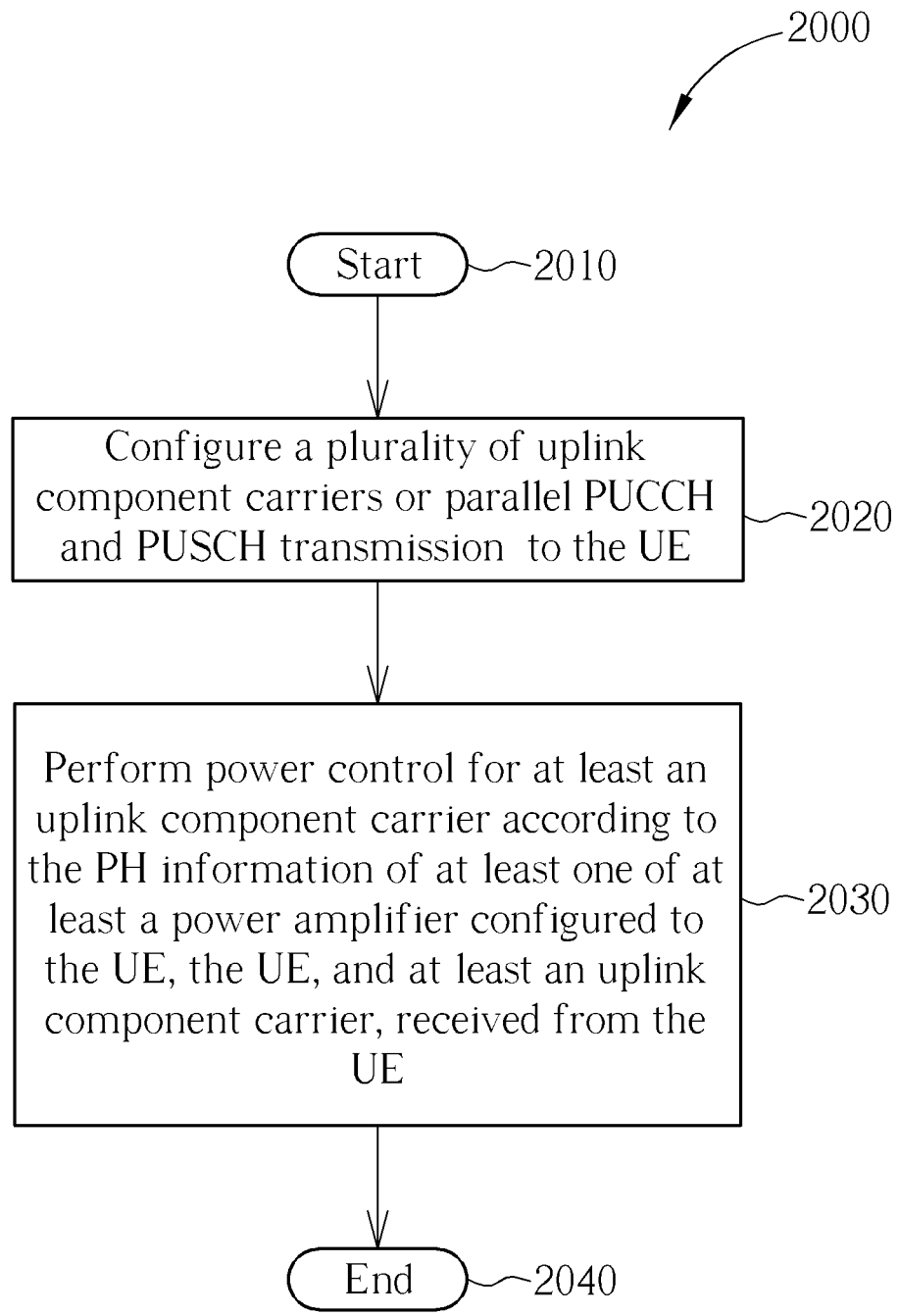
FIG. 20 is a flowchart of an exemplary process.

Please refer to FIG. 20, which illustrates a flowchart of an exemplary process 2000. The process 2000 is utilized in a network (e.g. eNB) for handling PH report. The process 2000 can be compiled into the program code 214 and includes the following steps:

Step 2010: Start.

Step 2020: Configure a plurality of uplink component carriers or parallel PUCCH and PUSCH transmission to the UE.

Step 2030: Perform power control for at least an uplink component carrier according to the PH information of at least one of at least a power amplifier configured to the UE, the UE, and at least an uplink component carrier, received from the UE.

Step 2040: End.

According to the process 2000, the network controls uplink transmission power and/or manage uplink resource (e.g. resource block (RB) assignment, modulation and coding scheme (MCS)) based on the PH report for uplink component carrier, PA, and/or UE. Therefore, an allocated transmission power on a component carrier may not exceed the PH limitation of the component carrier, the corresponding PA, and/or the UE. The detailed description can be referred from above, so it is not given herein.

Please note that, the abovementioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20.

In conclusion, the present invention provides methods and apparatus for handling PHRs in multiple uplink component carrier system. The UE shall report at least one of PH information of a component carrier, PH information of a PA, and PH information of the UE, to the network, so that the network can allocate suitable resource for the UE.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of performing power headroom reporting, hereafter called PHR, for a communication device configured with a plurality of uplink component carriers or parallel PUCCH and PUSCH transmission in a wireless communication system, the method comprising:

reporting power headroom information of at least one of the communication device, at least an uplink component carrier, and at least a power amplifier configured to the communication device, to a network of the wireless communication system with a medium access control protocol data unit, hereafter called MAC PDU, when the PHR is triggered;

wherein the MAC PDU includes a bitmap for indicating absence of the power headroom information of at least one of the power amplifier, the component carrier, and the communication device.

2. The method of claim 1, wherein the MAC PDU further includes at least one of mapping information between the uplink component carrier and the power amplifier, a power amplifier identification for the power headroom information of the power amplifier, a component carrier identification for the power headroom information of the uplink component carrier, a virtual power headroom information for at least one of the power amplifier, the uplink component carrier and the communication device, and an indicator to indicate if the virtual power headroom information is used.

3. The method of claim 1, further comprising:
receiving mapping information between the power amplifier and the uplink component carrier with a first message for component carrier configuration, from the network; or
transmitting the mapping information with a second message for component carrier configuration completing, to the network.

4. The method of claim 1, wherein the power headroom information of the power amplifier, uplink component carrier, or communication device includes a value, which is estimated according to at least one of a configured transmitted power for a cell, a maximum power amplifier output power, a maximum power reduction (MPR), an additional maximum power reduction (AMPR), transmission power on the plurality of uplink component carriers, maximum output power of the communication device, maximum allowed output power of the communication device signaled by a protocol layer higher than the MAC layer, a number of the uplink component carrier mapped to the power amplifier, channel bandwidth, a number of the uplink component carrier, transmission power for PUCCH, transmission power for PUSCH, the power headroom information of the power amplifier, and the power headroom information of another uplink component carrier.

5. The method of claim 1, wherein the PHR is triggered according to at least one of configuration or reconfiguration of the PHR functionality, expiry of a first timer for the PHR, activation, deactivation, configuration or de-configuration of an uplink component carrier, expiry of a second timer for the power amplifier, and expiry of a third timer for the communication device.

6. The method of claim 1, wherein reporting the power headroom information of at least one of the communication device, at least an uplink component carrier, and at least a power amplifier configured to the communication device, to the network of the wireless communication system when the PHR is triggered comprises:
reporting the power headroom information to the network by at least a medium access control (MAC) control element, hereafter called MAC CE, when the PHR is triggered, wherein the MAC CEs have at least two formats, and a format that the communication device uses is indicated by the network.

7. A method of performing power headroom reporting, hereafter called PHR, for a communication device configured with a plurality of uplink component carriers or parallel PUCCH and PUSCH transmission in a wireless communication system, the method comprising:
reporting power headroom information for at least an uplink component carrier with consideration of at least one of a power headroom limitation of the communication device and a power headroom limitation of a power amplifier configured to the communication device for the at least an uplink component carrier.

8. The method of claim 7, wherein reporting power headroom information for the at least an uplink component carrier with consideration of at least one of the power headroom limitation of the communication device and the power headroom limitation of the power amplifier configured to the communication device for the at least an uplink component carrier comprises:
reporting the power headroom information for the uplink component carrier with a predetermined weight for the uplink component carrier or priority of the uplink component carrier and the power headroom limitation.

9. A method of handling power headroom report for a network in a wireless communication system, the method comprising:
configuring a plurality of uplink component carriers or parallel PUCCH and PUSCH transmission to a communication device of the wireless communication system;
performing power control for at least an uplink component carrier according to the power headroom report of at least one of at least a power amplifier configured to the communication device, the communication device, and at least an uplink component carrier, received from the communication device; and
transmitting mapping information between the power amplifier and the uplink component carriers with a message for component carrier configuration, to the communication device.

10. A communication device of a wireless communication system for performing power headroom reporting, hereafter called PHR, the communication device being configured with a plurality of uplink component carriers or parallel PUCCH and PUSCH transmission and comprising:
means for receiving and/or transmitting a signal to a network of the wireless communication system; and
means for reporting power headroom information of at least one of the communication device, at least an uplink component carrier, and at least a power amplifier configured to the communication device, to the network with a medium access control protocol data unit, hereafter called MAC PDU, when the PHR is triggered;
wherein the MAC PDU includes a bitmap for indicating absence of the power headroom information of at least one of the power amplifier, the component carrier, and the communication device.

11. The communication device of claim 10, wherein the MAC PDU further includes at least one of mapping information between the uplink component carrier and the power amplifier, a power amplifier identification for the power headroom information of the power amplifier, a component carrier identification for the power headroom information of the uplink component carrier, a virtual power headroom information for at least one of the power amplifier, the uplink component carrier and/or the communication device, and an indicator to indicate if the virtual power headroom information is used.

12. The communication device of claim 10, further comprising:
means for receiving mapping information between the power amplifier and the uplink component carrier with a first message for component carrier configuration, from the network; or
means for transmitting the mapping information with a second message for component carrier configuration completing, to the network.

13. The communication device of claim 10, wherein the power headroom information of the power amplifier, uplink component carrier, or communication device includes a value, which is estimated according to at least one of a configured transmitted power for a cell, a maximum power amplifier output power, a maximum power reduction (MPR), an additional maximum power reduction (AMPR), transmission power on the plurality of uplink component carriers, maximum output power of the communication device, maximum allowed output power of the communication device signaled by a protocol layer higher than the MAC layer, a number of the uplink component carrier mapped to the power amplifier, channel bandwidth, a number of the uplink component carrier, transmission power for PUCCH, transmission power for PUSCH, the power headroom information of the power amplifier, and the power headroom information of another uplink component carrier.

14. The communication device of claim 10, wherein the PHR is triggered according to at least one of configuration or reconfiguration of the PHR functionality, expiry of a first timer for the PHR, activation, deactivation, configuration or de-configuration of an uplink component carrier, expiry of a second timer for the power amplifier, and expiry of a third timer for the communication device.

15. The method of claim 14, wherein the format of the MAC CE is determined by the network according to at least one of whether a secondary serving cell (SCell) is configured, and whether parallel PUCCH and PUSCH transmission is supported or configured to the communication device.

16. The communication device of claim 10, wherein reporting the power headroom information of at least one of the communication device, at least an uplink component carrier, and at least a power amplifier configured to the communication device, to the network of the wireless communication system when the PHR is triggered comprises:
reporting the power headroom information to the network by at least a medium access control (MAC) control element, hereafter called MAC CE, when the PHR is triggered, wherein the MAC CEs have at least two formats, and a format that the communication device uses is indicated by the network.

17. A communication device of a wireless communication system for performing power headroom reporting, hereafter called PHR, the communication device being configured with a plurality of uplink component carriers or parallel PUCCH and PUSCH transmission and comprising:
means for receiving and/or transmitting a signal to a network of the wireless communication system; and
means for reporting power headroom information for at least an uplink component carrier with consideration of at least one of a power headroom limitation of the communication device and a power headroom limitation of a power amplifier configured to the communication device for the at least an uplink component carrier when the PHR is triggered.

18. The communication device of claim 17, wherein the means for reporting power headroom information for the at least an uplink component carrier with consideration of at least one of the power headroom limitation of the communication device and the power headroom limitation of the power amplifier configured to the communication device for the at least an uplink component carrier comprises:
means for reporting the power headroom information for the uplink component carrier with a predetermined weight for the uplink component carrier or priority of the uplink component carrier and the power headroom limitation.

19. A network of a wireless communication system for handling power headroom report comprising:
means for configuring a plurality of uplink component carriers or parallel PUCCH and PUSCH transmission to a communication device of the wireless communication system;
means for performing power control for at least an uplink component carrier according to the power headroom report of at least one of at least a power amplifier configured to the communication device, the communication device, and at least an uplink component carrier, received from the communication device; and
means for transmitting mapping information between the power amplifier and the uplink component carrier with a message for component carrier configuration, to the communication device.

20. A method of performing power headroom reporting, hereafter called PHR, for a communication device configured with a plurality of uplink component carriers or parallel PUCCH and PUSCH transmission in a wireless communication system, the method comprising:
reporting power headroom information of at least one of the communication device, at least an uplink component carrier, and at least a power amplifier configured to the communication device, to a network of the wireless communication system with at least a medium access control (MAC) control element, hereafter called MAC CE, when the PHR is triggered;
wherein the MAC CEs have at least two formats, and a format that the communication device uses is indicated by the network.

21. A method of performing power headroom reporting, hereafter called PHR, for a communication device configured with a plurality of uplink component carriers or parallel PUCCH and PUSCH transmission in a wireless communication system, the method comprising:
reporting power headroom information of at least one of the communication device, at least an uplink component carrier, and at least a power amplifier configured to the communication device, to a network of the wireless communication system with a medium access control protocol data unit, hereafter called MAC PDU, when the PHR is triggered;
wherein the MAC PDU includes a virtual power headroom information for at least one of the power amplifier, the uplink component carrier and the communication device.

* * * * *